(12) United States Patent
Steele et al.

(10) Patent No.: US 8,276,624 B2
(45) Date of Patent: Oct. 2, 2012

(54) SEALANT BOTTLE SNAP-IN FEATURE FOR VEHICLE TEMPORARY MOBILITY KIT

(75) Inventors: Kimberly Ann Steele, Northville, MI (US); Darryl L. Jones, Southfield, MI (US); Yingchao Guan, Nanjing (CN)

(73) Assignee: Ford Global Technologies, LLC, Dearborn, MI (US)

( * ) Notice: Subject to any disclaimer, the term of this patent is extended or adjusted under 35 U.S.C. 154(b) by 1106 days.

(21) Appl. No.: 12/023,542

(22) Filed: Jan. 31, 2008

(65) Prior Publication Data
US 2009/0193937 A1 Aug. 6, 2009

(51) Int. Cl.
B65B 31/00 (2006.01)
(52) U.S. Cl. ............ 141/38; 141/114; 141/313; 81/15.6
(58) Field of Classification Search ............... 141/5, 44, 141/65–67, 98, 100, 104, 105, 114, 231, 141/285, 301–302, 313, 372, 38; 81/15.2, 81/15.6; 137/223–234.5, 597; 152/509
See application file for complete search history.

(56) References Cited

U.S. PATENT DOCUMENTS

| | | | |
|---|---|---|---|
| 5,908,145 A | 6/1999 | Jaksa | |
| 5,941,577 A * | 8/1999 | Musellec | 285/317 |
| 6,092,569 A | 7/2000 | Simmel et al. | |
| 6,431,225 B1 | 8/2002 | Dudley | |
| 6,736,170 B2 | 5/2004 | Eriksen et al. | |
| 6,766,834 B1 * | 7/2004 | Eckhardt | 141/38 |
| 6,789,581 B2 | 9/2004 | Cowan et al. | |
| 6,938,651 B1 | 9/2005 | Carter et al. | |
| 6,964,284 B2 | 11/2005 | Eckhardt | |
| D557,299 S | 12/2007 | Marini et al. | |
| D613,320 S | 12/2007 | Marini | |
| 7,694,698 B2 | 4/2010 | Marini | |
| 7,695,312 B2 | 4/2010 | Steele et al. | |
| 7,789,110 B2 | 9/2010 | Marini | |
| 7,798,183 B2 | 9/2010 | Cegelski et al. | |
| 7,828,336 B2 * | 11/2010 | Gammons | 285/317 |
| 7,878,360 B2 | 2/2011 | Takeda | |
| 2003/0047652 A1 * | 3/2003 | Eckhardt | 248/121 |
| 2005/0191193 A1 | 9/2005 | Chou | |
| 2005/0284536 A1 * | 12/2005 | Kojima et al. | 141/38 |
| 2006/0021472 A1 | 2/2006 | Ragan et al. | |
| 2007/0181209 A1 | 8/2007 | Stehle | |
| 2008/0277044 A1 | 11/2008 | Marini | |
| 2009/0066487 A1 | 3/2009 | Miller et al. | |

(Continued)

FOREIGN PATENT DOCUMENTS

EP 1747878 1/2007

(Continued)

OTHER PUBLICATIONS

Paul Williams, "Product Review: AirMan Tire Repair Sytstem", Canadian Driver, Oct. 15, 2004, 3 pages.

(Continued)

*Primary Examiner* — Gregory Huson
*Assistant Examiner* — Jason K Niesz
(74) *Attorney, Agent, or Firm* — Fredrick V. Owens; Just Intellectuals, PLLC

(57) ABSTRACT

A temporary mobility kit directed to a release arrangement for selectively releasing a sealant bottle from the base of the kit is disclosed.

15 Claims, 4 Drawing Sheets

U.S. PATENT DOCUMENTS

| | | | |
|---|---|---|---|
| 2009/0107578 A1* | 4/2009 | Trachtenberg et al. | 141/5 |
| 2009/0193937 A1 | 8/2009 | Steele et al. | |
| 2009/0266440 A1 | 10/2009 | Lolli et al. | |
| 2009/0301602 A1 | 12/2009 | Lolli et al. | |
| 2010/0005930 A1 | 1/2010 | Lolli et al. | |

FOREIGN PATENT DOCUMENTS

| | | |
|---|---|---|
| JP | 2000-238144 | 9/2000 |
| JP | 2001-212883 | 8/2001 |
| WO | 2006024534 A1 | 3/2006 |
| WO | 2008035163 A2 | 3/2008 |
| WO | 2009/019590 | 2/2009 |
| WO | 2009027792 | 3/2009 |
| WO | 2009156817 | 12/2009 |

OTHER PUBLICATIONS

Author Unknown, "Notes on the safe use of the ContiComfort Kit", www.conticomfortkit.co.uk, Jul. 2007.

Richards, John, Letter of Jun. 28, 2010 from TEK Global contesting inventorhship, 2 pages.

U.S. Patent No. 7,695,312 titled "Cord Wrap and Power Receptacle Arrangement for Inflator" is now Inter Partes Reexamination No. 95/000,581, filed Dec. 9, 2010.

Richards, John, Letter re: "U.S. Appl. No. 12/023,542," May 31, 2012, two pages.

Unknown, Ladas & Parry's English Translation of JP2001-212883, May 31, 2012, 13 pages.

Unknown, Ladas & Parry's English Translation of JP 2000-238144, May 31, 2012, 21 pages.

* cited by examiner

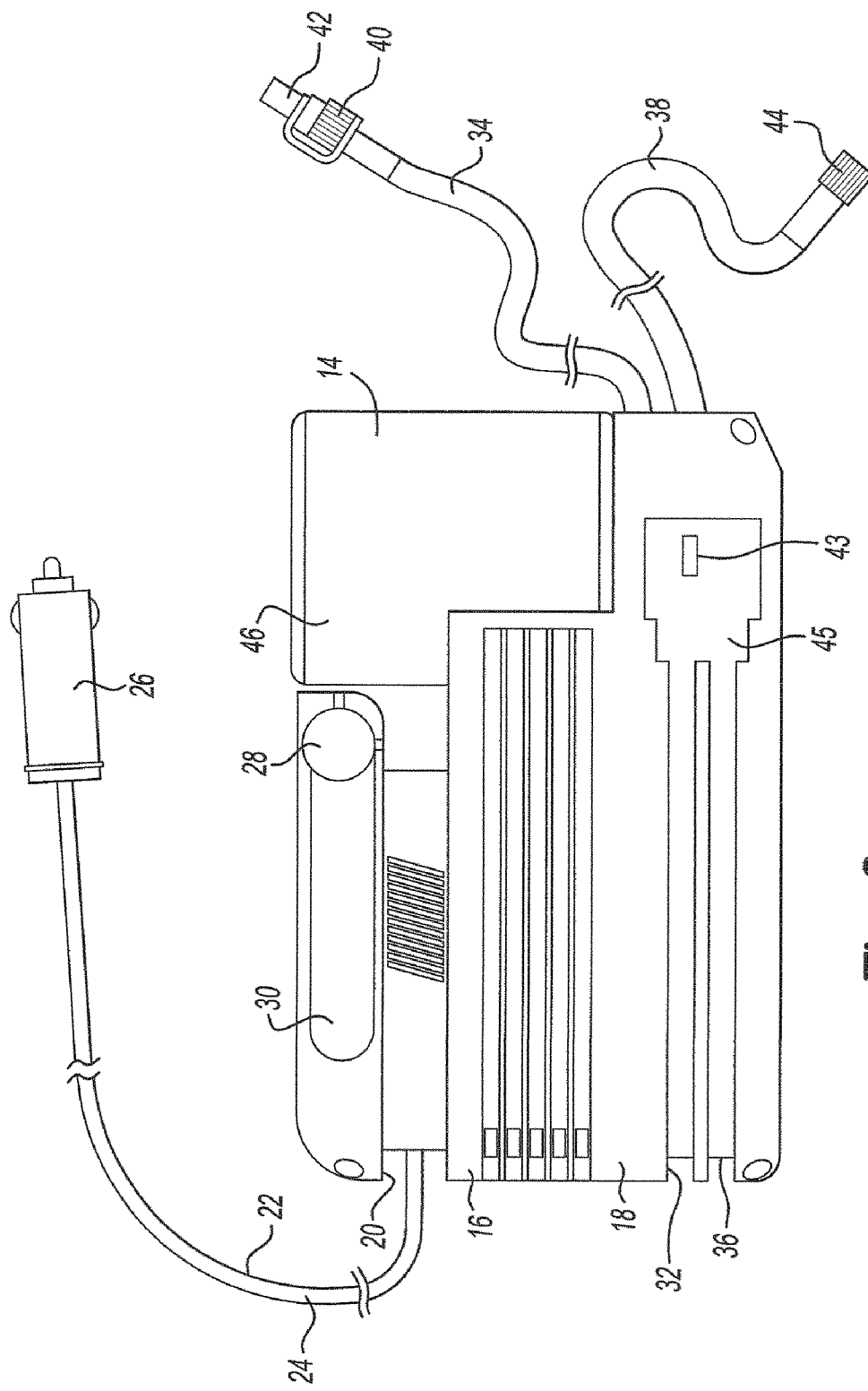

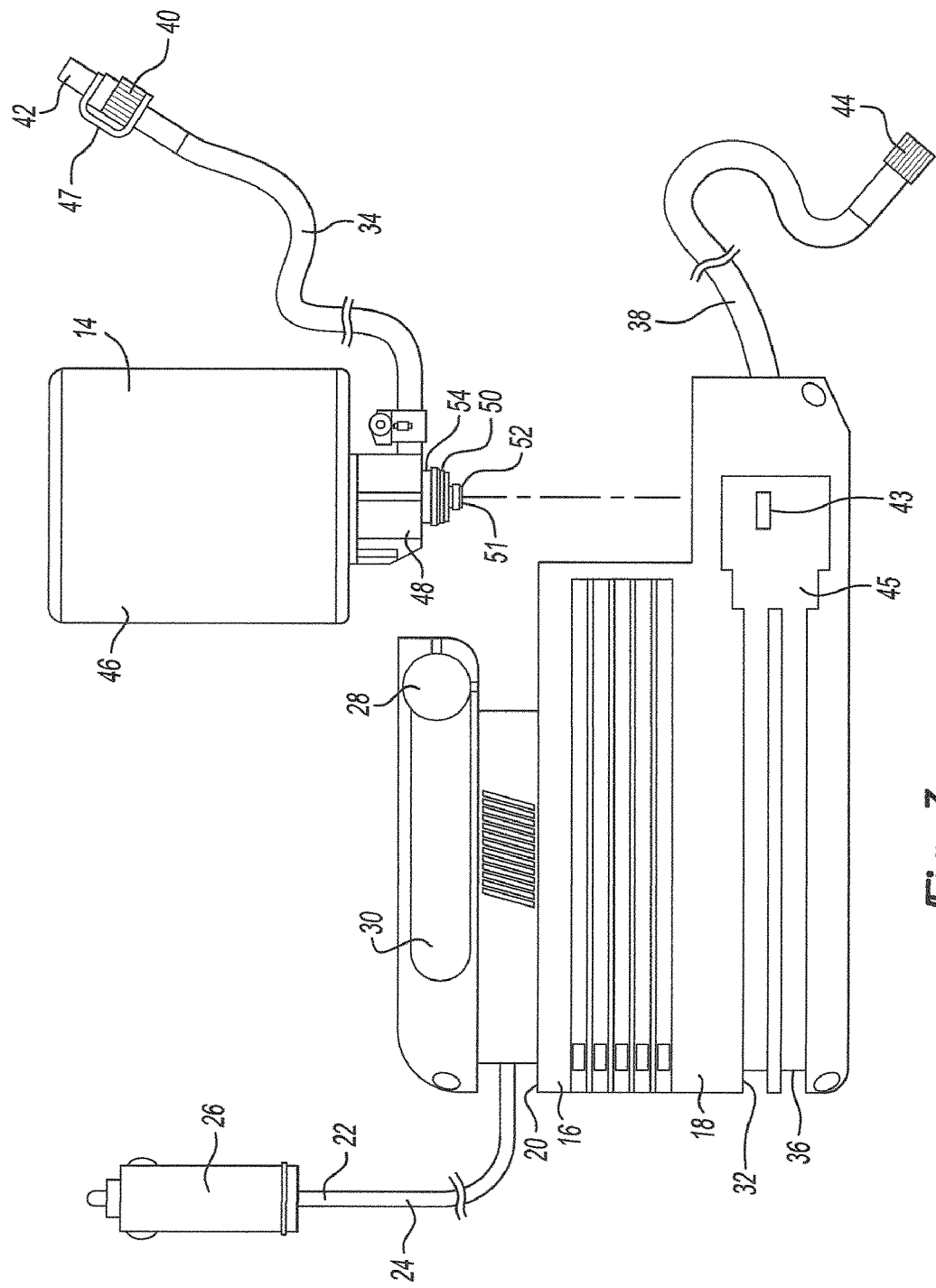

SEALANT BOTTLE SNAP-IN FEATURE FOR VEHICLE TEMPORARY MOBILITY KIT

CROSS-REFERENCE TO RELATED APPLICATION

This application is a continuation-in-part and claims the benefit of U.S. Non-Provisional patent application Ser. No. 11/894,390 titled "SWITCH AND HOSE-VALVE CONNECTION ARRANGEMENT FOR VEHICLE TEMPORARY MOBILITY KIT" filed Aug. 20, 2007, which is hereby incorporated by reference in its entirety.

TECHNICAL FIELD

The present invention relates generally to portable inflator units. More particularly, the present invention relates to a release arrangement for releasing a snap-in sealant bottle of a temporary mobility kit for a vehicle from the base of the kit.

BACKGROUND

Automotive manufacturers have traditionally offered spare tires with the fleet of vehicles they produce. In the early days of automobiles the spare tire was mounted externally on either the running board or on a rear-mounted tire carrier. To comply with advances in styling the spare tire was concealed, most typically being moved inside the vehicle's trunk. While this arrangement provided a suitable solution for placement of the spare tire for decades, changes in fuel economy requirements dictated the need for vehicle weight reduction. Manufacturers reviewed the vehicle anew in its entirety seeking ways to reduce vehicle weight. One answer to the effort to reduce overall vehicle weight was to replace the conventional, large and bulky road tire with a smaller temporary tire or "donut."

While the temporary tire represented a significant decrease in overall vehicle weight, the further improvement in tire design and durability as well as the concurrent general improvement in roadways gradually began to reduce the need for relying on a spare tire at all.

In response to these advances in both tire technology and road quality, vehicle auto manufacturers have begun to substitute a "temporary mobility kit" (or "TMK") for the spare tire. The TMK includes a dual-purpose air compressor and a sealing system. The sealing system includes a sealing compound that will effectively seal most punctures caused by nails or similar objects. The air compressor drives the sealing compound into the compromised tire and, subsequently, can be used to re-inflate the tire. The growing trend today is for manufacturers to equip the vehicle with a temporary mobility kit within a space provided in the vehicle, such as (but not exclusively) in the spare tire well of the trunk.

While providing clear advantages over the weight demands of the spare tire as well as providing the vehicle operator with a practical alternative over the demands of tire changing, as in most every area of vehicle technology the development of temporary mobility kits is in a continuing state of development.

SUMMARY

A preferred embodiment of the disclosed invention is a temporary mobility kit directed to a release arrangement for selectively releasing a sealant bottle from the base of the kit. The temporary mobility kit includes a removable sealant bottle and a kit base. A recessed release button is provided in the kit base. The release button is part of a slidable retaining member which is slidably fitted to a snap-in ring assembly. The snap-in ring assembly is fitted to the kit base. An oval-shaped opening is defined in the slidable retaining member. Resilient members are provided to resist movement of the slidable retaining member. The sealant bottle has a base on which a locking collar is formed. The locking collar can be passed through the oval-shaped opening of the slidable retaining member and is locked into position therewith. The slidable retaining member is ordinarily in a locked or retaining position to hold the sealant bottle in place. A release tool is provided for manipulation of the recessed release button. When the release tool is pressed against the recessed release button, the slidable retaining member is moved from its locking position to its unlocking position, and the sealant bottle is released therefrom.

Other features of the invention will become apparent when viewed in light of the detailed description of the preferred embodiment(s) when taken in conjunction with the attached drawings and the appended claims.

BRIEF DESCRIPTION OF THE DRAWINGS

For a more complete understanding of this invention, reference should now be made to the embodiment illustrated in greater detail in the accompanying drawings and described below by way of examples of the invention wherein:

FIG. 2 is a view similar to that of FIG. 1 but showing the electrical cable, sealant hose, and inflator hose in their unstored conditions as may be the case for repairing and inflating a tire;

FIG. 3 is a view similar to that of FIG. 2 but illustrates the sealant assembly removed and spaced-apart from the switch-inflator assembly;

DETAILED DESCRIPTION

Figure 1:
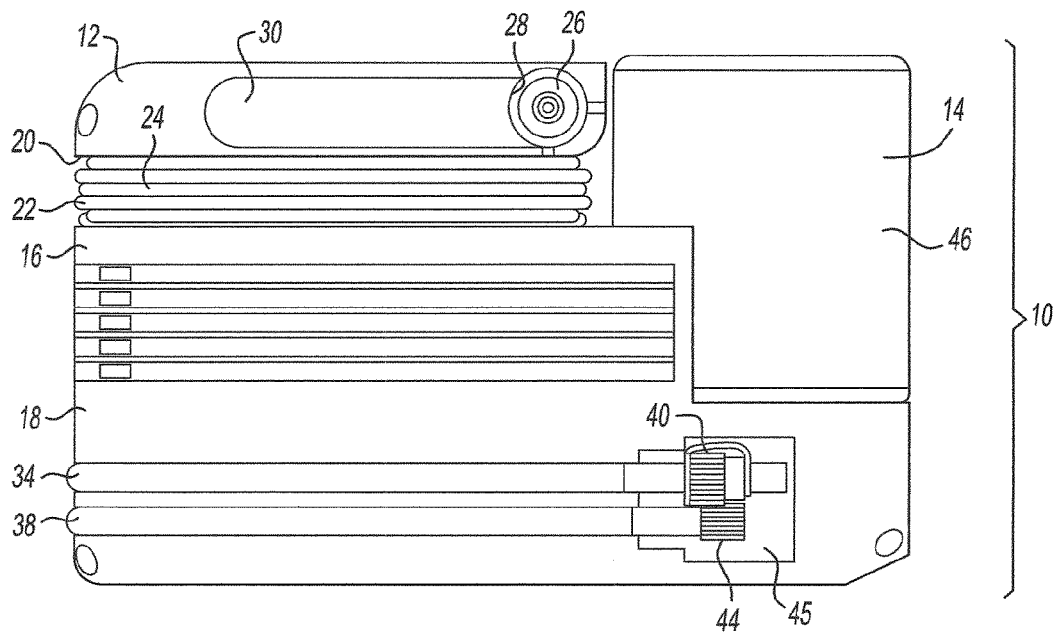
FIG. 1 illustrates an side view of the temporary mobility kit of the disclosed invention showing the electrical cable, sealant bottle, sealant hose, and inflator hose in their stored conditions.

In the following figures, the same reference numerals will be used to refer to the same components. In the following description, various operating parameters and components are described for one constructed embodiment. These specific parameters and components are included as examples and are not meant to be limiting.

Referring to the drawings and in particular to FIGS. 1 and 2, a side view of a temporary mobility kit, generally illustrated as 10, is shown. The temporary mobility kit 10 includes a switch-inflator assembly 12 and a sealant assembly 14. While preferably being a one-piece part, the switch-inflator assembly 12 includes an upper area 16 and a lower area 18.

The upper area 16 includes a peripheral recessed area 20 about which a cord portion 22 of an electrical plug assembly 24 is wrapped when the electrical plug assembly 24 is not in use. A plug 26 adapted for use in the vehicle's power point (not shown) is provided. A plug-receiving aperture 28 is provided to receive and retain the plug 26 when not in use. The peripheral recessed area 20 and the plug-receiving aperture 28 are more clearly seen in FIG. 2.

Figure 6:
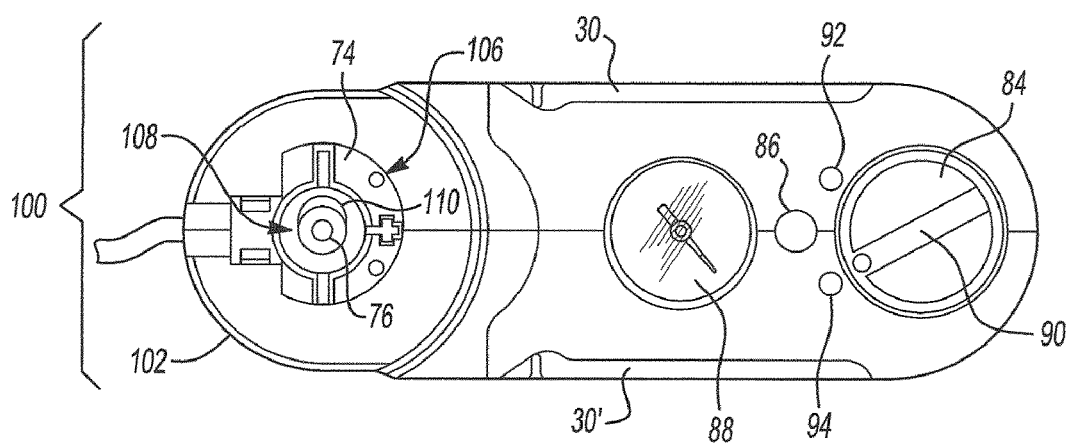
FIG. 6 is a top view of the switch-inflator assembly with snap-in assembly.

A pair of opposed channels are defined on the opposite sides of the upper area 16 of the switch-inflator assembly 12, of which only one channel, 30, is visible in FIGS. 1 and 2 (the opposite channel is illustrated in FIG. 6, discussed below). The opposed channels are provided to allow for the user to readily grasp and lift the temporary mobility kit 10.

The lower area 18 of the switch-inflator assembly 12 includes a first channel 32 for receiving and retaining a sealant hose 34 when the sealant hose 34 is not in use. The lower area 18 of the switch-inflator assembly 12 further includes a second channel 36 for receiving and retaining an inflator hose 38 when the inflator hose 38 is not in use. The first channel 32 and the second channel 36 are more clearly seen in FIG. 2.

The sealant hose 34 includes a sealant tire valve connector 40 for releasable attachment to a tire valve. A combination dust cover 41 and release tool 42 is removably attached to the sealant valve connector 40. The dust cover 41 and release tool 42 includes a release tool 42 protruding from the outer surface of the cover portion. The release tool 42 is provided to engage a button 43 attached to a release tab which lockably engages the sealant assembly 14 to the switch-inflator assembly 12. The release tool 42 is flexibly attached to the sealant valve connector 40 by a flexible strap 47. The details of the arrangement of the combination dust cover 41 and release tool 42 are more clearly visualized in FIG. 5 which is discussed below.

The inflator hose 38 also includes an inflator tire valve connector 44 for releasable attachment to a tire valve. A recessed area 45 is defined in the side of the lower area 18 for accommodating the sealant tire valve connector 40 and the inflator tire valve connector 44 when the sealant hose 34 and the inflator hose 38 are stored in the first channel 32 and the second channel 36, respectively.

The sealant assembly 14 is removably attached to the switch-inflator assembly 12. The sealant assembly 14 includes the sealant hose 34 and a sealant bottle 46. The sealant bottle 46 contains a tire sealant which, when introduced into a tire, coats the inner walls of the tire to prevent air pressure loss due to slow leaks and tread punctures. The tire sealant typically comprises a solution or suspension of latex material and water. The composition may or may not include high molecular weight fiber component. The composition solidifies upon reaching the hole. Solidification results from a combination of exposure to air, vibration, and elevated temperature.

FIG. 3 is a view of the temporary mobility kit 10 similar to that of FIGS. 1 and 2 but illustrates the sealant assembly 14 being removed and spaced apart from the switch-inflator assembly 12. The sealant assembly 14 includes a base 48 which mates with a receptacle defined in the switch-inflator assembly 12. The base 48 includes a sealing arrangement such as an upper O-ring 50 and a lower O-ring 52 which forms a fluid-tight seal with an aperture defined in the base of the receptacle 51. The O-rings 50 and 52 are provided to assure that no air leaks from the temporary mobility kit 10 during operation in which compressed air is pumped from the switch-inflator assembly 12, into the sealant assembly 14, and out of the sealant hose 34, carrying a quantity of the tire sealant. The O-rings 50 and 52 provide a re-sealable connection between the switch-inflator assembly 12 and the sealant assembly 14 when the sealant assembly 14 is removed for inspection or replacement. A locking snap-in collar 54 is formed on the base 48 for releasable attachment to the switch-inflator assembly 12 as will be described below.

Figure 4:
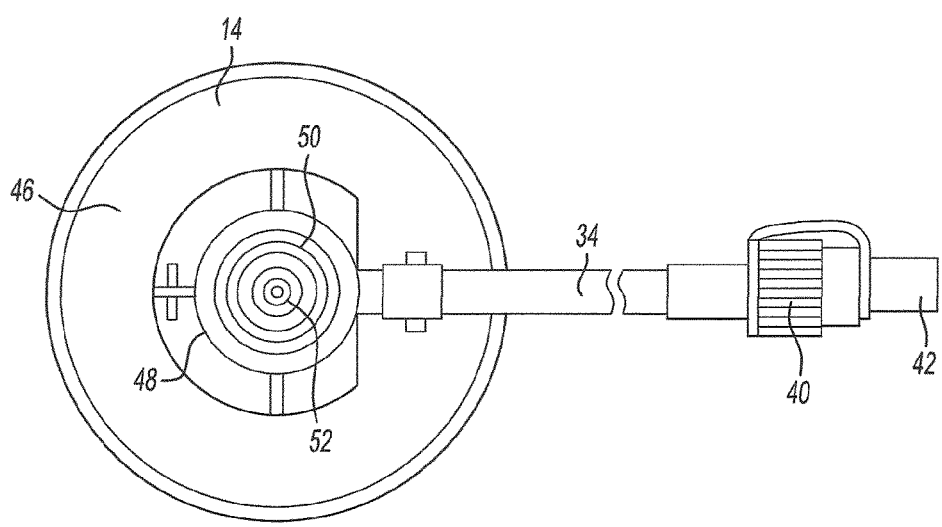
FIG. 4 is an underside view of the sealant assembly.

FIG. 4 illustrates a view of the underside of the sealant bottle 46 and the associated sealant hose 34. The base 48 includes the upper O-ring 50, the lower O-ring 52, and the locking snap-in collar 54 or slidable latching mechanism.

Figure 5:
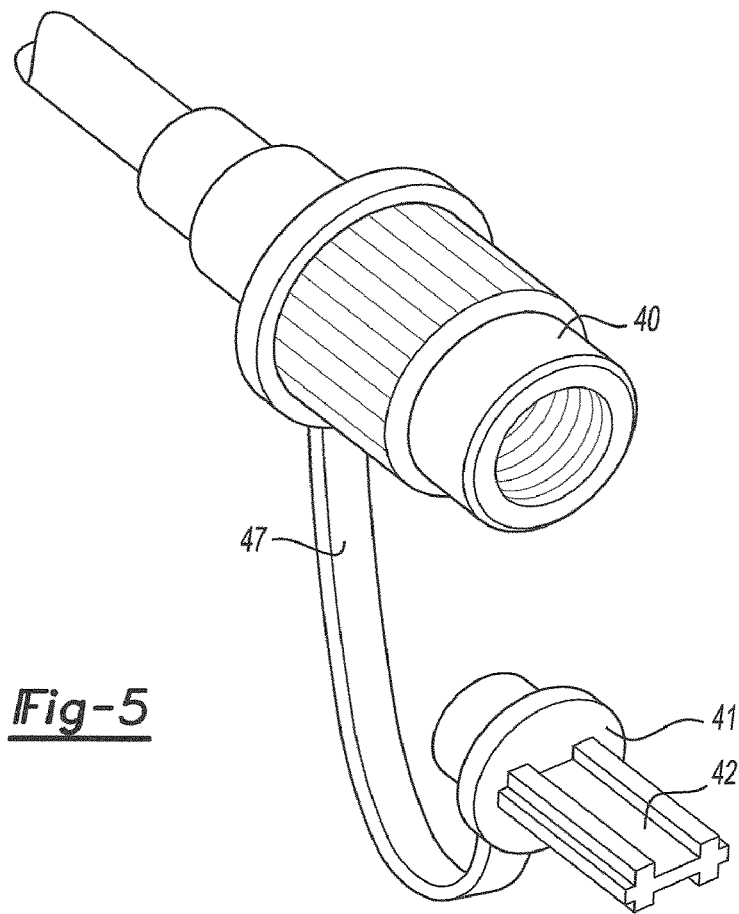
FIG. 5 is perspective view of the combination dust cover and release tool shown in relation to the sealant valve connector.

As set forth above, FIG. 5 illustrates the combination dust cover or cap 41 and release tool 42. The release tool 42 is attached to the sealant valve connector 40 by the flexible strap 47. It is to be understood that the release tool 42 may be provided in another manner and in a different configuration than that illustrated. The configuration provided is thus only illustrative and is not intended to be limiting Referring to FIG. 6, a receptacle 74 is defined in the switch-inflator assembly 12. The receptacle 74 releasably receives the base 48 of the sealant assembly 14. A connecting port 76 is centrally defined in the receptacle 74 for fluidly mating with the sealant bottle 46 of the sealant assembly. The O-rings 50 and 52 are engaged with the interior wall of the connecting port 76 when the sealant assembly 14 is attached to the switch-inflator assembly 12 to form a fluid-tight seal. The locking arrangement will be discussed further below with respect to FIGS. 7 and 8.

With reference still to FIG. 6, the switch-inflator assembly 12 also includes a diverter switch 84, a power-on, power-off button 86, and an air pressure gauge 88. The power-on, power-off button 86 may be of a variety of types but is preferably a momentary switch. Placement of these components as set forth in FIG. 6 is only suggestive and is not to be taken as being limiting. However, with each of these components being positioned on the top of the switch-inflator assembly 12 they are reachable by a user and also provide an easy view of the operating condition of the temporary mobility kit 10 in its relation to the tire.

The diverter switch 84 includes a knob 90. The diverter switch 84 may also be characterized as a function switch. The diverter switch 84 provides the temporary mobility kit 10 with a way of allowing the user to select between the sealant function and the air inflation function. The selection arrangement presented herein allows only one function to be enabled at a time. The knob 90 may be rotated between a position 92 which is the air inflation position and a position 94 which is the sealant function position. As illustrated, the position of the diverter switch 84 is in the sealant function as the knob 90 has been rotated to the position 94. In this position the diverter switch 84 is open, and the tire sealant composition can be introduced into the tire only if the tire valve connector 40 is connected to one of the vehicle's tire valves (not shown) because of completion of an electrical circuit. Alternatively, the knob 90 may be rotated to the position 92. In this position the diverter switch is closed and the tire can be inflated.

The power-on, power-off button 86 operates to engage or disengage the temporary mobility kit 10. The air pressure gauge 88 provides the user with information as to the amount of air pressure in the subject tire in real time.

FIG. 6 also shows a user-grasping channel 30' defined in the upper area 16 of the switch-inflator assembly 12 which is opposite the channel 30 shown in FIGS. 1 and 2 and discussed above in conjunction therewith. The arrangement for releasably locking the sealant bottle 46 to the switch-inflator assembly 12 is illustrated in detail. Particularly, a snap-in assembly, generally illustrated as 100, is provided. The snap-in assembly 100 is substantially fitted to within the switch-inflator assembly 12. A portion of the snap-in assembly 100 is visible in FIG. 6.

The snap-in assembly 100 includes a snap-in assembly base 102 having a sealant output line formed thereon. The sealant output line is in fluid communication with the fluid pump provided internally within the switch-inflator assembly 12.

Formed on the upper area of the snap-in assembly base 102 is a recessed area 106. A slidable retaining member 108 is slidably provided in the recessed area 106. The recessed release button 43 shown in FIG. 3 is continuous with the slidable retaining member 108 (or slidable latching mechanism). Defined through the slidable retaining member 108 is an oval-shaped aperture 110—formed to selectively retain locking collar 54—having a beveled edge generally defined along its perimeter. A first resilient member and a second resilient member (e.g., as shown in FIGS. 7 and 8 of U.S. Patent Publication No. 2009/0050232 titled "Switch and Hose-Valve Connection Arrangement for Vehicle Temporary Mobility Kit") are provided between the slidable retaining member 108 and an interior wall of the recessed area 106. The first resilient member and the second resilient member may be any of a variety of resilient structures, and the illustrated version of these members being coiled springs is not to be taken as limiting but rather as illustrative. Furthermore, while the overall configuration of the snap-in assembly 100 is illustrated herein in some detail, it is to be understood that this configuration is only suggestive and it is not to be taken as limiting. Other shapes for the snap-in assembly base 102, the slidable retaining member 108, and the aperture 110 may be utilized without restriction while achieving the same basic objectives of providing a practical and cost-effective structure for releasably retaining the sealant bottle 46 to the switch-inflator assembly 12.

It will likely become desirable to inspect or replace the sealant bottle 46 either because of use or because of expiration of the warranty period. Accordingly, in operation, to release the sealant bottle 46 from the switch-inflator assembly 12, the operator presses the end of the release tool 42 against the button 43. This causes the associated slidable retaining member 108 to be pushed inward, with the larger portion of the oval-shaped aperture 110 being generally moved into position over the connecting port 76. Thus aligned, the locking snap-in collar 54, which has a diameter which is lesser than that of the oval-shaped aperture 110, is allowed to freely pass through the oval-shaped aperture 110, thus releasing the sealant bottle 46 from the switch-inflator assembly 12.

Attachment of the sealant bottle 46 to the switch-inflator assembly 12 is accomplished by reversing the steps set forth above. Particularly, the operator would generally align the base 48 of the sealant bottle 46 over the connecting port 76 of the switch-inflator assembly 12. The operator then pushes against the sealant bottle 46 such that the locking snap-in collar 54 of the base 48 pushes against the oval-shaped aperture 110 of the slidable retaining member 108. As the area adjacent the oval-shaped aperture 110 is beveled, the positioning of the locking snap-in collar 54 on top of the oval-shaped aperture 110 and the pushing of the force of the sealant bottle 46 applied against the oval-shaped aperture 110 causes movement of the wider portion of the oval-shaped aperture 110 of the slidable retaining member 108 to be moved such that it is generally positioned over the connecting port 76. The locking snap-in collar 54 of the base 48 is thus allowed to pass thereby. Once the base 48 is substantially fully fitted within the connecting port 76 the slidable retaining member 108 is moved back to its locking position by the resilient members, thus positioning the narrower portion of the oval-shaped aperture 110 between the underside of the sealant bottle 46 and the upper side of the locking snap-in collar 54, thus locking the sealant bottle 46 in place.

While the invention has been described in connection with one or more embodiments, it is to be understood that the specific mechanisms and techniques which have been described are merely illustrative of the principles of the invention, numerous modifications may be made to the methods and apparatus described without departing from the spirit and scope of the invention as defined by the appended claims.

What is claimed is:

1. A temporary mobility kit for use in repairing a leak in a tire, comprising:
    a sealant assembly including a source of tire sealant and a base, said base including a first connector; and
    a switch-inflator assembly including a second connector;
    wherein said second connector includes a slidable retaining member movable between a base retaining position and a base releasing position;
    a tool for moving said slidable retaining member to said base releasing position.

2. The temporary mobility kit of claim 1, wherein said first connector is a male component and said second connector is a female component.

3. The temporary mobility kit of claim 2, wherein said first connector includes a base and a locking collar formed on said base.

4. The temporary mobility kit of claim 3, wherein said base further includes at least one fluid-sealing o-ring provided thereon.

5. The temporary mobility kit of claim 3, wherein said slidable retaining member has an aperture defined therein, said aperture being formed to selectively retain said locking collar of said base.

6. The temporary mobility kit of claim 5, wherein said aperture is oval-shaped.

7. The temporary mobility kit of claim 1, further including at least one resilient member positioned between a kit housing and said slidable retaining member.

8. A temporary mobility kit for use in repairing a leak in a tire, comprising:
    a sealant assembly, having a bas eand a male connector;
    a switch-inflator assembly including a female connector releasably attachable to said male connector;
    wherein said female connector includes a slidable retaining member movable between a base retaining position and a base releasing position and a tool for moving said slidable retaining member.

9. The temporary mobility kit of claim 8, wherein said male connector includes a base and a locking collar formed on said base.

10. The temporary mobility kit of claim 9, wherein said base further includes at least one fluid-sealing o-ring provided thereon.

11. The temporary mobility kit of claim 9, wherein said slidable retaining member has an aperture defined therein to selectively retain said collar of said base.

12. The temporary mobility kit of claim 11, wherein said aperture is oval-shaped.

13. The temporary mobility kit of claim 8, further including at least one resilient member positioned between a kit housing and said slidable retaining member.

14. A releasable attachment assembly for retaining a fluid container to a pump assembly for fluid association therewith, the attachment assembly comprising:
    a first connector formed on the fluid container;
    a second connector formed on the pump assembly, said first connector being releasably matable with said second connector, wherein said second connector includes a slidable latching mechanism; and
    a tool for moving said slidable latching mechanism;
    said first connector and second connector forming a latch assembly being movable between a retaining position in which said first connector is fastened to said second connector and a releasing position in which said first connector is released from said second connector.

15. The releasable attachment assembly of claim 14, wherein said first connector includes a base and a locking collar.

* * * * *